US010009239B2

(12) United States Patent
Reilly et al.

(10) Patent No.: US 10,009,239 B2
(45) Date of Patent: Jun. 26, 2018

(54) METHOD AND APPARATUS OF ESTIMATING CONVERSATION IN A DISTRIBUTED NETFLOW ENVIRONMENT

(71) Applicant: AirMagnet, Inc., Santa Clara, CA (US)

(72) Inventors: Peter Reilly, Colorado Springs, CO (US); Benjamin Nelson, Colorado Springs, CO (US)

(73) Assignee: AirMagnet, Inc., Santa Clara, CA (US)

( * ) Notice: Subject to any disclaimer, the term of this patent is extended or adjusted under 35 U.S.C. 154(b) by 51 days.

(21) Appl. No.: 15/232,610

(22) Filed: Aug. 9, 2016

(65) Prior Publication Data
US 2018/0048541 A1 Feb. 15, 2018

(51) Int. Cl.
*G01R 31/08* (2006.01)
*H04L 12/26* (2006.01)
*H04L 29/12* (2006.01)

(52) U.S. Cl.
CPC ........... *H04L 43/04* (2013.01); *H04L 43/028* (2013.01); *H04L 61/6068* (2013.01)

(58) Field of Classification Search
CPC ........................ H04L 12/26; H04B 37/0236
USPC ................................................ 370/252–339
See application file for complete search history.

(56) References Cited

U.S. PATENT DOCUMENTS

| 2011/0246209 | A1* | 10/2011 | Jagannathan | G06Q 10/04 705/1.1 |
| 2012/0207046 | A1* | 8/2012 | Di Pietro | H04L 41/16 370/252 |
| 2013/0212265 | A1* | 8/2013 | Rubio Vidales | H04L 12/14 709/224 |
| 2015/0269178 | A1 | 9/2015 | Rhodes | |

OTHER PUBLICATIONS

Extended European Search Report for European Patent Application No. 17185571.1, dated Dec. 11, 2017.
Calligari, C. et al: "The LogLog counting reversible sketch: A distributed architecture for detecting anomalies in backbone networks", Communications (ICC), 2012 IEEE International Conference on, IEEE, Jun. 10, 2012 (Jun. 10, 2012), pp. 1287-1291, XP032273656, DOI: 10.1109/ICC.2012.6363825, ISBN: 978-1-4577-2052-9, Chapter II.A, p. 1288; chapter III, pp. 1289-1290; Chapter IV, p. 1290; figure 2.

(Continued)

*Primary Examiner* — Iqbal Zaidi
(74) *Attorney, Agent, or Firm* — Locke Lord LLP; Scott D. Wofsy; Christopher J. Capelli

(57) ABSTRACT

A distributed network traffic flow monitoring system is provided. The system includes a plurality of network packet flow collector devices for receiving netflow packets associated with a traffic flow activity data at a network connection. The traffic flow activity data includes one or more transmissions between particular source and destination IP addresses. The system further includes a network packet flow coordinator device connected to the plurality of network packet flow collector devices and configured to aggregate probabilistic information related to the traffic flow activity data from the one or more of network packet flow collector devices and to estimate cardinality of the traffic flow activity data based on the aggregated probabilistic information.

16 Claims, 6 Drawing Sheets

(56) References Cited

OTHER PUBLICATIONS

Flajolet, P. et al: "HyperLogLog: the analysis of a near-optimal cardinality estimation algorithm", Discrete Mathematics and Theoretical Computer Science, Jan. 31, 2007 (Jan. 31, 2007), pp. 137-156, XP055430447, ISSN: 1462-7264, Abstract—Chapter 1, pp. 127-131; figure 1.

Zhen, M. et al: "Highly compact virtual maximum likelihood sketches for counting big network data", 2014 52nd Annual ALLERTON Conference on Communication, Control, and Computing (ALLERTON), IEEE, Sep. 30, 2014 (Sep. 30, 2014), pp. 1188-1195, XP032731051, DOI: 10.1109/ALLERTON.2014.7028590 [retrieved on Jan. 30, 2015], chapter V. p. 1192.

\* cited by examiner

| Source IP Address |
| --- |
| Destination IP Address |
| Next Hop IP Address |
| Inbound IF Index |
| Outbound IF Index |
| Packet Count |
| Byte Count |
| Flow Start Time |
| Flow End Time |
| Source Port |
| Destination Port |
| TCP Flags |
| IP Type of Service |
| Source Autonomous ID |
| Destination Autonomous ID |
| Source Mask Bits Count |
| Destination Mask Bits Count |

←200

Flow Record

FIG. 2

METHOD AND APPARATUS OF ESTIMATING CONVERSATION IN A DISTRIBUTED NETFLOW ENVIRONMENT

FIELD OF THE INVENTION

Embodiments of this invention relate to network communications and usage analysis, and particularly to methods and apparatus for estimating conversation in a distributed netflow environment.

BACKGROUND OF THE INVENTION

Packetized data networks are in widespread use transporting data throughout the world. Packetized data networks typically format data into packets for transmission between one computer and another. These packets include headers containing information relating to packet data and routing. The data networks send these packets from the originating computer to the destination computers using routers which send the packet on to the destination computer using the routing information in the packet header. A flow of packets are a group of packets sent from a particular source network address and port to a destination network address and port. These particular destination source network addresses and ports may, for example, correspond to different computers.

Netflow is a known network protocol which may be used for collecting and monitoring Internet Protocol (IP) traffic. Some netflow analyzing engines keep only the top number (normally up to 1000) of source, destination IP addresses based solely on the volume of data associated with the IP address. The disadvantage of filtering the information in this manner is that the actual flow information is lost, in particular the context of the resulting information (e.g., the source and destination ports associated with the source and destination IP addresses). Hence, such engines are unable to identify attacks as all distribution information is lost. Other netflow analyzing engines retain only a subset of the flows (normally around 10,000 flows in a time period of one hour). The subset is normally based on the flow octet size. This technique reduces the storage required for flows while, in contrast to the technique outlined above, still retaining some distribution information.

The so-called "conversations" are the transmissions between the particular source and destination IP addresses and ports which are typically stored and sorted in order to establish the respective associations between them. If the conversation count is large, a high volume of traffic is demonstrated which could indicate a port scanning attack. Previously, a single system for processing traffic flow data received from a network probe device would count (up to a limit) the number of conversations, without providing an actual count of conversations beyond that limit. This approach breaks down in an integrated distributed environment comprising a plurality of netflow collectors as the processing system runs the risk of double counting conversations that have been seen by multiple netflow collectors.

It is desired to implement methods and procedures that overcome these problems by providing a technique for efficient processing and analysis of netflow data in a distributed environment.

SUMMARY OF THE INVENTION

The purpose and advantages of the illustrated embodiments will be set forth in and apparent from the description that follows. Additional advantages of the illustrated embodiments will be realized and attained by the devices, systems and methods particularly pointed out in the written description and claims hereof, as well as from the appended drawings.

In accordance with a purpose of the illustrated embodiments, in one aspect, a distributed network traffic flow monitoring system is provided. The system includes a plurality of network packet flow collector devices for receiving netflow packets associated with a traffic flow activity data at a network connection. The traffic flow activity data includes one or more transmissions between particular source and destination IP addresses. The system further includes a network packet flow coordinator device connected to the plurality of network packet flow collector devices and configured to aggregate probabilistic information related to the traffic flow activity data from the one or more of network packet flow collector devices and to estimate cardinality of the traffic flow activity data based on the aggregated probabilistic information.

In another aspect, a method for estimating cardinality of traffic flow activity data in a distributed network traffic flow monitoring system is provided. One or more requests are sent by a network packet flow coordinator device to a plurality of network packet flow collector devices operatively connected to the network packet flow coordinator device. These requests are sent responsive to receiving a corresponding request from a client device. The client request includes criteria for filtering the traffic flow activity data. Responses received from the plurality of network packet flow collector devices are aggregated. The aggregated responses include probabilistic information related to the traffic flow activity data. Cardinality of the traffic flow activity data is estimated based on the aggregated probabilistic information.

BRIEF DESCRIPTION OF THE DRAWINGS

The accompanying appendices and/or drawings illustrate various, non-limiting, examples, inventive aspects in accordance with the present disclosure:

FIG. 2 is a block diagram illustrating the fields of each flow record in an exemplary embodiment of the present invention;

DETAILED DESCRIPTION OF CERTAIN EMBODIMENTS

Figure 1:
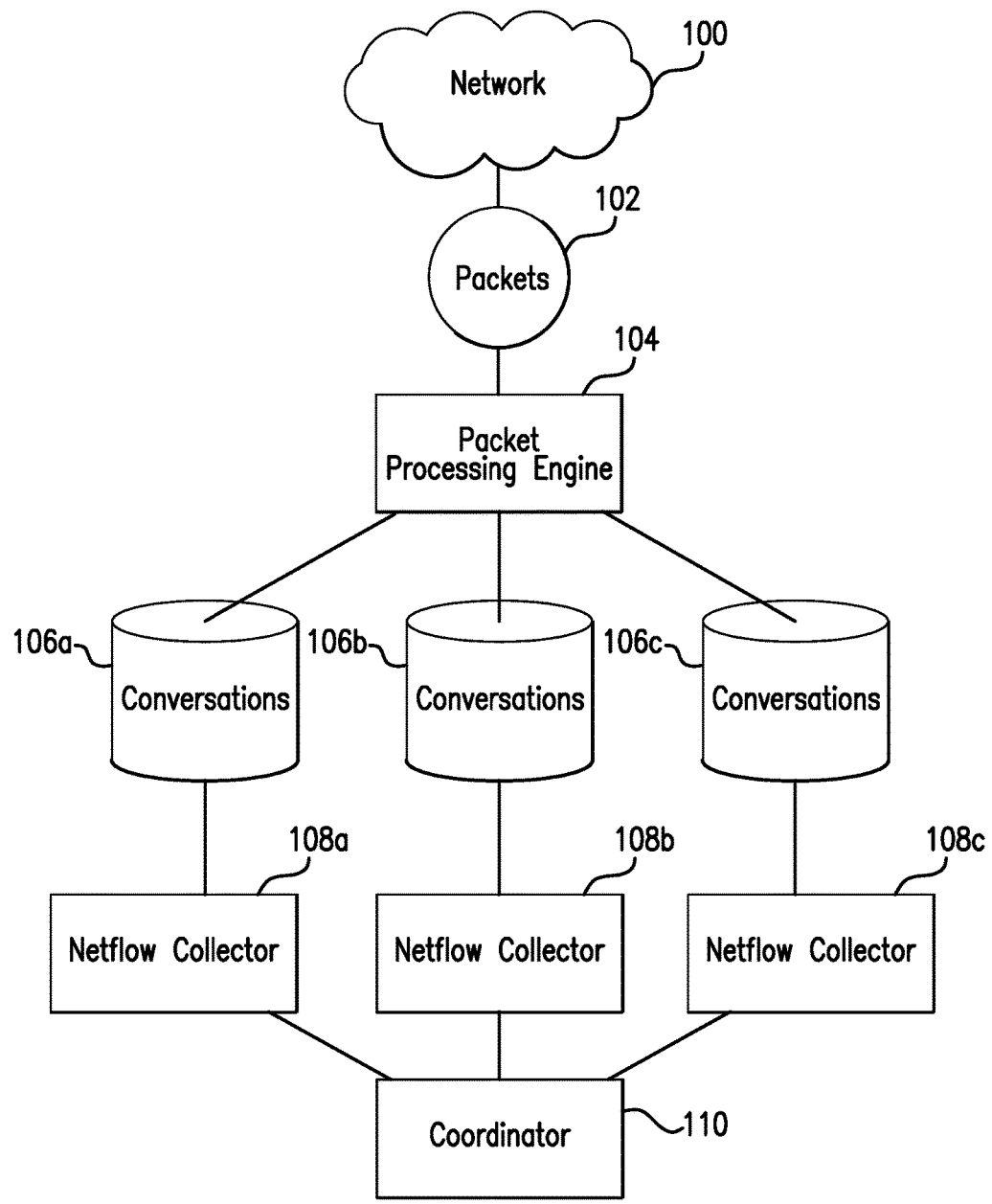
FIG. 1 is a block diagram illustrating a distributed network traffic flow monitoring system for processing and providing flow information in a network.

The present invention is now described more fully with reference to the accompanying drawings, in which illustrated embodiments of the present invention are shown wherein like reference numerals identify like elements. The present invention is not limited in any way to the illustrated embodiments as the illustrated embodiments described below are merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present invention. Furthermore, the terms and phrases used herein are not intended to be limiting but rather to provide an understandable description of the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, exemplary methods and materials are now described. It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described below. One skilled in the art will appreciate further features and advantages of the invention based on the below-described embodiments. Accordingly, the invention is not to be limited by what has been particularly shown and described, except as indicated by the appended claims.

In exemplary embodiments, a computer system component may constitute a "module" that is configured and operates to perform certain operations as described herein below. Accordingly, the term "module" should be understood to encompass a tangible entity, be that an entity that is physically constructed, permanently configured (e.g., hardwired) or temporarily configured (e.g. programmed) to operate in a certain manner and to perform certain operations described herein.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

As used herein, "netflow" includes any network protocol that can be used for collecting network traffic (e.g., IP traffic) information. Such network protocols include, for example, NetFlow Services Export Version 9 as provided in Internet Engineering Task Force Request for Comments (RFC) 3954, and IP Flow Information Export (IPFIX) Protocol, as provided in RFC 5101.

As will be referred to herein, the term netflow collector denotes the entity that processes traffic and generates netflow, IPFIX, or any other flow collection protocol, whereby traffic is classified into flows and these flows' activity recorded. Similarly, the term flow coordinator denotes the entity that receives and processes the flow data and uses it for such purposes as estimating cardinality of traffic activity.

FIG. 1 is a block diagram illustrating a distributed network traffic flow monitoring system for processing and providing flow information in a network. As packets 102 carried on a network 100 are received and processed by a packet processing engine 104, information on the received packet flows is stored in one or more conversation repositories 106a-106c (collectively referred to as conversation repositories 106). In some embodiments, the packet processing engine 104 may be an element of a network monitoring device, such as a passive network tap (not shown in FIG. 1), configured to obtain traffic flow activity data carried on the network 100. In some implementations, this flow activity data may include a plurality of transmissions between particular source and destination addresses (conversations) flowing through a particular point in a network, such as at the location of the network tap. The flow activity data may be stored in the plurality of conversation repositories. In one or more embodiments, each of the conversation repositories 106a-106c is a persistent storage device (or set of devices). The plurality of conversation repositories 106a-106c is also configured to deliver flow data to and receive flow data from a plurality of distributed netflow collectors 108a-108c (collectively referred to as netflow collectors 108). Each conversation repository 106a-106c may be a data store (e.g., a database, a file system, one or more data structures configured in a memory, some other medium for storing data, or any suitable combination thereof), which may include information (e.g., conversation, etc.) related to the network protocol analysis. Each conversation repository 106a-106c may be a device internal to a designated netflow collector 108. Alternatively, each conversation repository 106a-106c may be an external storage device operatively connected to one or more netflow collectors 108a-108c.

Each conversation stored in the designated conversations repository 106a-106c includes one or more flow records. A flow record, described in greater detail below, includes information about measured and characteristic properties of a specific predefined flow. At least in some embodiments, each of the conversation repositories 106a-106c may deliver data to a particular netflow collector 108 using an exporter. The term "exporter" includes software or hardware assisted entity (e.g., application, device or process) that resides with the conversation repositories 106. In various embodiments, the exporter may decide when to export, how to export and the format to export flow data from the conversation repository 106 to the netflow collector 108. Each distributed "netflow collector" 108 includes a device or process that receives flow records from one or more exporters. The netflow collectors 108a-108c manage (e.g., in terms of aggregation, storage, etc.) the flow data, which is typically used by other applications to analyze the network traffic, among other uses.

According to an embodiment of the present invention, in this distributed network monitoring architecture, a coordinator module 110 distributes data analysis queries to the plurality of netflow collectors 108a-108c, which in turn retrieves the relevant data from the respective local conversation repositories 106a-106c. As described below, in one embodiment, aggregated results are returned to the coordinator 110 which performs various processing operations over the aggregated results, for example, to return a global view across all the collectors.

FIG. 2 shows the contents of an exemplary flow record, containing relevant information about a flow. Netflow is a function available on commercial routers and provides traffic reports about groups of packets. A flow record 200 contains information about all packets that match the same key and were sent or received by a router during a particular time interval. As shown in FIG. 2, the fields include:

Source IP address
Destination IP address
Source IP port
Destination IP port
IP protocol
Number of octets in the flow
Number of packets in the flow
Type of service
Other fields The key for flow record 200 includes the source and destination IP addresses of the packet, the higher layer protocol used (i.e., TCP or UDP), the source and destination port numbers (if relevant to the higher layer protocol), and the incoming/outgoing interfaces on the router traversed by the packets. For example, all packets belonging to a TCP connection will be included in the same flow record. The information contained in flow record 200 includes the number of packets covered by the record, the total number of bytes in those packets, the time the first packet was received, and the time the last packet was received. Netflow function typically uses a "push" model of data collection. This means that all flow records 200 produced at a router are exported/emitted. Flow record 200 may be emitted at regular time intervals, for example each minute, by a router for each flow, so a single long lived flow would generate many flow records.

A filter for a specific query may be applied to each flow. Examples of such a filter may be flows within a certain time range or flows that match particular interfaces, etc. The filter may be composed of filter parameters for any combination of fields available in flow record 200. The filter parameters may be defined by values or range of values for the associated field. For example, a range of IP address values may be defined for example as a net mask, and a port range may be defined from a start value to an end value. In one embodiment, the coordinator 110 may be configured for detection of distributed denial of service and/or port scan network attacks, and therefore collects and analyzes flow records 200 within a predetermined time window in order to efficiently identify active netflows to a particular source or destination IP address.

Figure 3:
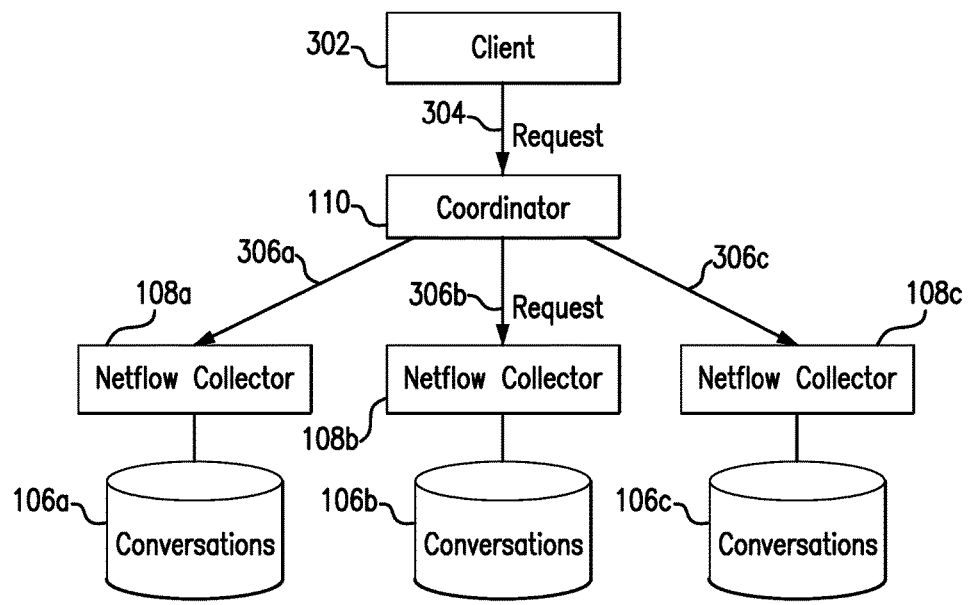
FIG. 3 shows a functional block diagram illustrating an exemplary process of sending a request to one or more netflow collectors responsive to receiving a request from a client using an existing technology.

FIG. 3 shows a functional block diagram illustrating an exemplary process of sending a request to one or more netflow collectors responsive to receiving a request from a client using an existing technology. As shown in FIG. 3, a client 302 operatively coupled to the coordinator 110 sends one or more requests 304 in a form acceptable to the coordinator 110 (i.e., a query). For example, the client 302 may request information associated with the conversation volume of the top n devices on the monitored network 100 for a specific time period. As another non-limiting example, the client 302 may be interested in identifying all conversations utilizing a specific conversation protocol. As used herein, the term "conversation protocol" refers to a set of rules to be followed when interacting with a particular service. Different network services can have the same conversation protocol or have different conversation protocols. In other words, conversations take place within the rules defined by the conversation protocol.

The coordinator 110 subsequently sends the received request to a set of distributed netflow collectors 108a-108c. In response to receiving these requests 306a-306c, each netflow collector 108a-108c analyzes observed conversations that are stored in associated conversation repositories 106a-106c in order to identify conversations matching the filtering criteria specified in the received requests 306a-306c. For example, netflow collectors 108a-108c may analyze a combination of packet headers, ports, and conversation signatures in order to determine the relevant conversations.

Figure 4:
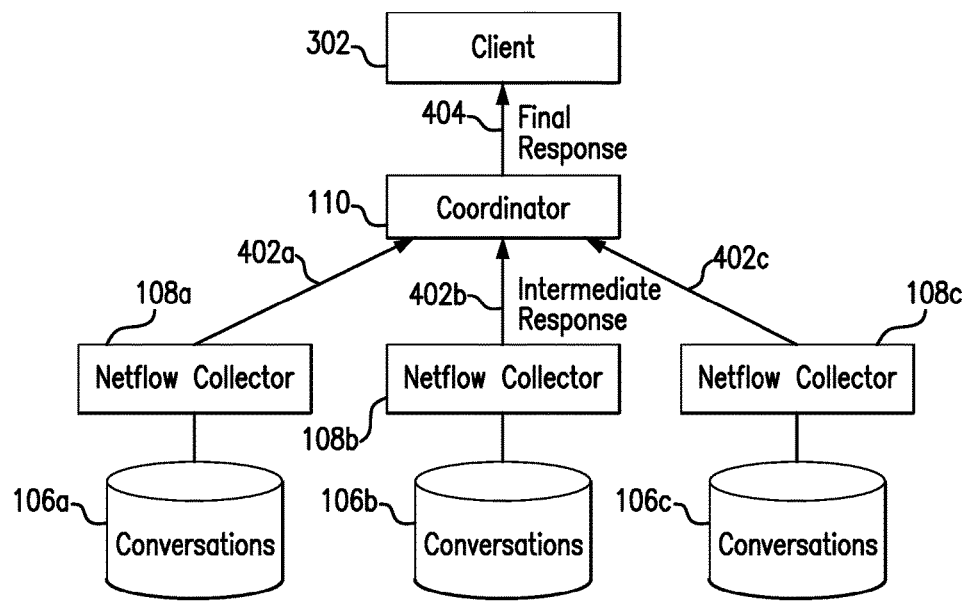
FIG. 4 shows a functional block diagram illustrating an exemplary process of responding to client's request(s) using an existing technology.

FIG. 4 shows a functional block diagram illustrating an exemplary process of responding to client's request(s) using an existing technology. As shown in FIG. 4, one or more distributed netflow collectors 108 perform an analysis to identify relevant conversations and send back one or more intermediate return responses 402a-402c, based on the identified relevant conversations, back to the coordinator 110. For example, if client's request 304 included a transport protocol for a predetermined audio and/or video data streams for a specific time frame, the one or more netflow collectors 108a-108c will stream the identified audio and/or video sub streams as part of the intermediate response 402a-402c. The coordinator 110 is then able to aggregate the set of responses, sort the results, remove duplicate records and then perform cardinality estimation prior to sending a final response 404 to the client 302. However, at runtime, this method proves to be highly inefficient because the coordinator 110 performs the sorting and removal of duplicates in memory (i.e., cache memory). In other words, the memory footprint would grow in size based on the total number of records returned by the netflow collectors 108a-108c in all intermediate responses 402a-402c. Accordingly, as data streams become very large (i.e., the number of dataflow elements contained in that stream is very high), the amount of data required to be collected, maintained, processed and stored may become prohibitive. In alternative well-known approach the amount of memory consumed by the coordinator 110 may be bounded. However, in this more complex approach, the coordinator 110 performs sorting of a results subset and periodically pages sections of the overall result set to a non-volatile computer storage media. Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by the coordinator 110. It should be noted this approach typically requires a more complex algorithm as well, as more time is spent reading/writing pages to the non-volatile computer storage media.

Figure 5:
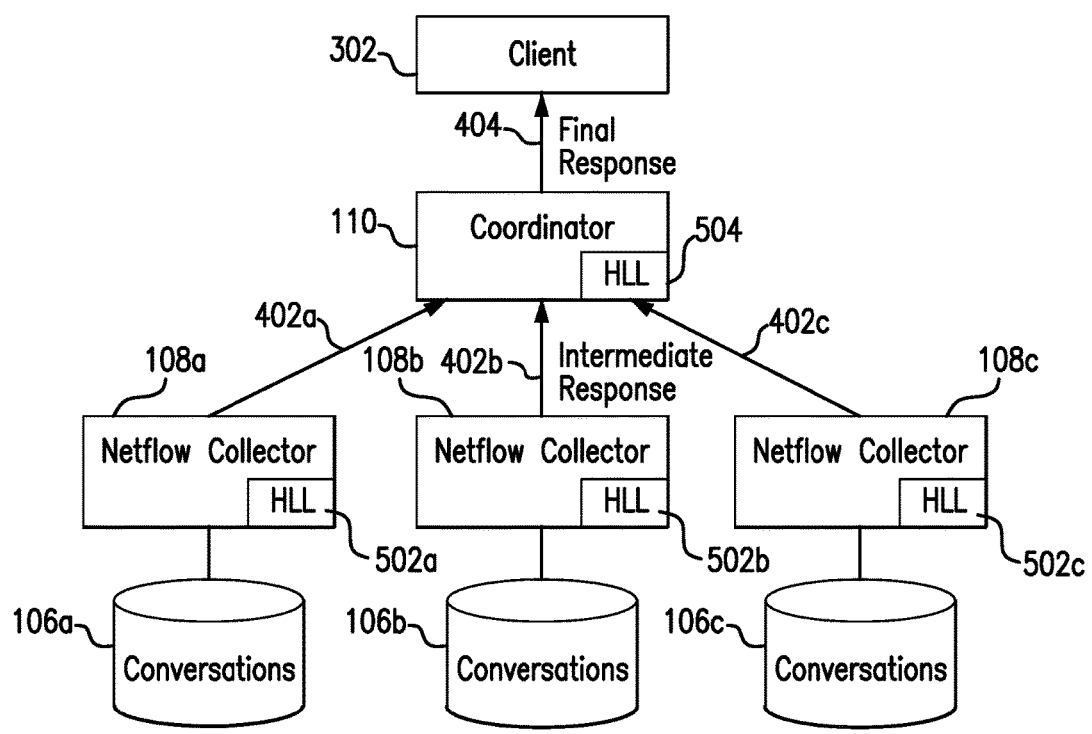
FIG. 5 shows a functional block diagram illustrating an exemplary process of responding to client's request(s) using probabilistic counters in accordance with an embodiment of the present invention.

FIG. 5 shows a functional block diagram illustrating an exemplary process of responding to client's request(s) using probabilistic counters in accordance with an embodiment of the present invention. As noted above, as data streams returned by the netflow collectors 108a-108c become very large, the amount of data required to be collected, maintained, processed and stored may become prohibitive. As such, a number of techniques are employed herein to reduce the amount of data that must be collected and stored to determine cardinality on the basis of observed conversations. For some of these techniques, the observation that in some cases cardinality information of an element in a given data stream (including information relating to the count of distinct values in the data stream since the count started) can be within a sufficiently accurate estimation and/or within a particular confidence interval and remain more than adequate to perform analysis of the data stream characteristics, such as constructing a hit-ratio or miss-ratio curve. In other words, knowing that (i) a predicted value of a given conversation is within $\pm\varepsilon$ of the actual value of that conversation, and/or (ii) the predicted value of a given conversation will be within specific or generally understood upper and lower bounds of the actual value of that conversation, will be more than enough to determine the cardinality of conversations and their constituent flow elements, sufficient to be used, for example, to detect distributed denial of service and/or port scan network attacks for a given time period.

According to an embodiment of the present invention, one example of these techniques for reducing the number of data required for storing and processing relevant conversations, includes the use of probabilistic counters for calculating counter values at any given time, which makes it possible for the coordinator 110 to estimate within a known error limit all of the counter values at any given time without having calculated and/or stored all prior entries in the set of all possible counters for a given data stream; one example of such probabilistic counters may be HyperLogLog (hereinafter "HLL").

In some embodiments, data stream representations of multiple conversations can be combined to form a combined data stream representation that is indicative of the cardinality of the combined conversations. In other embodiments, the probabilistic counters comprise of union functions that can combine existing conversation values that were calculated by way of probabilistic counters; for example, HLL data structure includes a union function, that can be used to combine two conversations that were generated using HLL into a single conversation that would have resulted from an HLL-determined conversation from combining the data streams into the same aggregated data stream.

The HyperLogLog algorithm is well-known in the art. Much recent work has been devoted to making it space efficient and to reduce estimation bias. As such, it provides a good candidate data structure. Hence, at least in some embodiments, each netflow collector 108a-108c and the one or more coordinators 110 utilize probabilistic counters denoted as 502a-502c and 504 in FIG. 5, respectively. In some cases the probabilistic counter may be the HyperLogLog (HLL) methodology, but other methods known in the art may be used, including but not limited to LogLog, SuperLogLog, FM-85 (see Flajolet & Martin, "Probabilistic Counting Algorithms for Data Base Applications", JOURNAL OF COMPUTER AND SYSTEM SCIENCES 31, 182-209 (1985), incorporated by reference herein), among others. The HLL data structures 502a-502c, 504 are used by the coordinator 110 to estimate cardinality at any given time for a number of unique distinct value counters. This methodology can estimate a cardinality for a specified time period within a predetermined confidence level ($\varepsilon$, wherein if T is the true cardinality value then the estimated value, E, will be E within $(1\pm\varepsilon)$ T). In embodiments, the distinct value counters can be characterized as a determination or estimation (since some embodiments may use a probabilistic counter to estimate values).

Advantageously, the probabilistic counters may be associated with low space (memory) requirements and improved accuracy. The space required by each HLL counter is roughly logarithmic in N and M, for data streams of N data elements with M unique elements.

Embodiments provided herein leverage the HLL data structures 502a-502c, 504 to compress information relating to a data stream to, inter alia, generate distinct value counters efficiently and store data to generate HLL registers that can be used to recreate distinct value counters in any time interval during the specified time frame. In general, HLL operates on the premise that very small numbers within a data set are unlikely. It utilizes a hash function to normalize a distribution, wherein the same number will result in the same hashed result. Based on the observation that a number resulting in a hashed result in a binary format becomes smaller as the number of leading zeros increases, and that a binary number with a particular number of leading zeros is half as likely to occur in certain distributions as a number with one fewer leading zeros, the HLL uses the number of leading zeros in the hashed result to estimate, or act as a proxy for, the likelihood of a given data element in a data stream. The HLL captures a number of hashed results into an HLL register and then combines a number of estimates, using a mathematical formula (as described more fully in Flajolet et al., "HyperLogLog: the analysis of a near-optimal cardinality estimation algorithm" 2007 Conference on Analysis of Algorithms, DMTCS proc. AH, 2007, 127-146; incorporated herein by reference) to reduce the likelihood of an outlier, or "unlucky" estimate (e.g., capturing an extremely unlikely element early within a sample interval). The combination of a number of estimates, in addition to other functions, serves to reduce the effect of coincidence and thus the larger the number of samples in an HLL register, the closer HLL will approach the true cardinality for a given value.

HLL uses leading zeros in the hashed result as a proxy for smallness of the hashed result; HLL assumes that a small hashed result is unlikely, and then uses a mathematical operation (such as a weighted average to combine a number of several hashed results), thereby reducing the effects of outliers and/or "unluckiness", to provide an estimate of cardinality for a given data element in a given data stream. The number of samples in the weighted average is related to the accuracy of the estimate; an increase in the number of samples increases the accuracy.

In some embodiments the HLL data structures 108a-108c, 110 retain a register of values, wherein each location in the register is uniquely associated with each possible data element (i.e., conversation) in the data stream and each register value being populated with a value that is indicative of the probability of the data element having been experienced previously; this value may be referred to as the locality indicative value. The respective resulting HLL registers can then be used by the coordinator 110 and the netflow collectors 108a-108c to calculate the HLL (i.e. the probabilistic counter value).

In this way, an HLL value can be re-calculated for any time interval for any data stream. Moreover, these 2-dimensional data structures can be combined for multiple data streams or time periods prior to calculating the final HLL value or values. Further, an intersection of different data streams can be determined by comparing the 2-dimensional structures resulting from each data stream for any time interval therein. As such, it also permits for the union of non-disjoint sets (such as, but not limited to, conversations related to the same communication protocol or relating to the same source IP address). The HLL utilizes a register wherein the number of leading zeros for a given hashed sample is recorded and, using a small number of the trailing bits at the end of the hashed sample, a register is defined for a particular value. If the value in the register location is either empty or less than the number of leading zeros for the current hashed sample, the current value is placed into that location. If the value is greater, than the register is not updated.

Referring back to FIG. 5, the intermediate responses 402a-402c sent by one or more of the netflow collectors 108a-108c include values of corresponding HLL registers. A combined HLL register 504 is then generated by the coordinator 110. This combined HLL data structure 504 provides a compressed collection of all distinct value counters in a given time interval. It is therefore possible for the coordinator 110 to re-construct all the distinct value counters at any point in time. It also permits unions for non-disjoint sets (e.g. conversations matching a particular filter value). While examples of determining cardinality has been shown above in examples relating to network conversations, cardinality estimation has numerous other applications for any unique set of records in a distributed environment.

The following description of such examples is intended to illustrate, not limit, the numerous other applications involving streams of data, all of which may be supported by the subject matter provided for herein.

Figure 6:
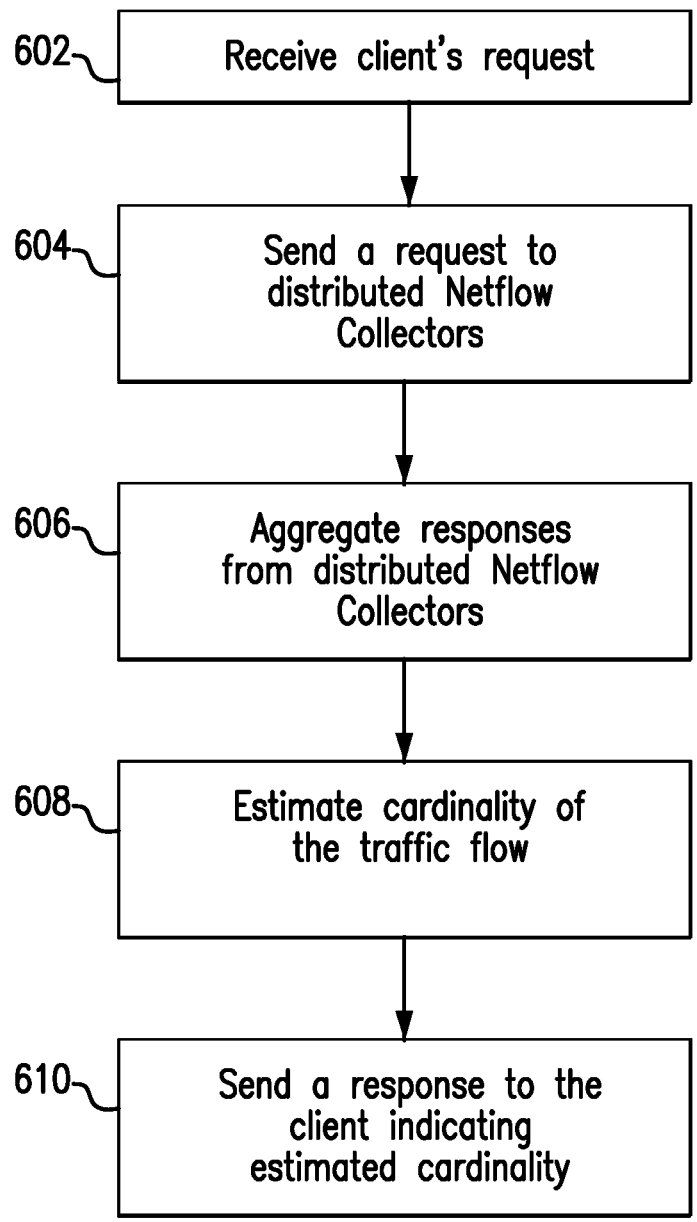
FIG. 6 is a flowchart of operational steps for estimating cardinality of the traffic flow activity data based on the aggregated information performed by the coordinator module of FIG. 5, in accordance with an illustrative embodiment of the present invention.

FIG. 6 is a flowchart of operational steps for estimating cardinality of the traffic flow activity data based on the aggregated information performed by the coordinator module of FIG. 5, in accordance with an illustrative embodiment of the present invention. Before turning to description of FIG. 6, it is noted that the flow diagram shown therein is described, by way of example, with reference to components shown in FIGS. 3-5, although these operational steps may be carried out in any system and are not limited to the scenario shown in the aforementioned figure. It should be appreciated that in some embodiments some of the steps described below may be combined into a single step. In some embodiments, one or more additional steps may be included.

Referring now to FIG. 2, at 602, the coordinator 110 receives a request (i.e., a query) 304 from the client 302 operatively coupled to the coordinator 110 (as shown in FIG. 3). In an embodiment, the request 304 received from the client device specifies criteria for filtering the traffic flow activity data. For example, the client 302 may request information associated with the cardinality of conversation volume of the top n devices on the monitored network 100 for a specific time period. As another non-limiting example, the client 302 may be interested in determining cardinality of all conversations utilizing a specific conversation protocol.

Subsequently, at 304, the coordinator 110 processes the received request 304 (e.g., identifies specified time period and/or filtering criteria) and sends corresponding requests 306a-306c to a set of distributed netflow collectors 108a-108c. In response to receiving these requests 306a-306c, each netflow collector 108a-108c analyzes the observed conversations that are stored in associated conversation repositories 106a-106c in order to identify conversations matching the filtering criteria specified in the received requests 306a-306c. For example, netflow collectors 108a-108c may analyze a combination of packet headers, ports, and conversation signatures in order to determine the relevant conversations. Once the relevant conversations are identified, the plurality of distributed netflow collectors 108a-108c utilizes respective HLL data structures 502a-502c (i.e., HLL counters) to estimate cardinality of the relevant conversations. In one embodiment, the netflow collectors 108a-108c can estimate a cardinality for a specified time period within a predetermined confidence level, i.e., approximately +/−2%.

In accordance with at least some embodiments of the present invention, referring now to FIG. 5, the intermediate responses 402a-402c sent back to the coordinator 110 may include HLL counters used by the corresponding netflow collectors 108a-108c to estimate cardinality. The coordinator 110 may be adapted to aggregate responses received from the plurality of netflow collectors 108a-108c. In one embodiment, the coordinator 100 performs a union function that can combine estimated conversation values that were received as HLL counters 502a-502c.

Once all intermediate responses 402a-402c are aggregated, at step 608, the coordinator 110 performs the cardinality estimation based on the results of the union function using, for example, the aforementioned HLL algorithm. HLL algorithm uses less memory and can estimate cardinality for large-scale data. In this exemplary embodiment, at step 610, the coordinator 110 reports the estimated cardinality of the traffic flow activity data back to the client 302.

In summary, various embodiments of the present invention contemplate application of HLL algorithm to netflow records in a distributed multi-collector environment. This approach enables complex and substantially accurate cardinality estimation functionality while keeping memory size small. This approach does not require or assume any level of caching and can be readily implemented in a system without any cache.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 7:
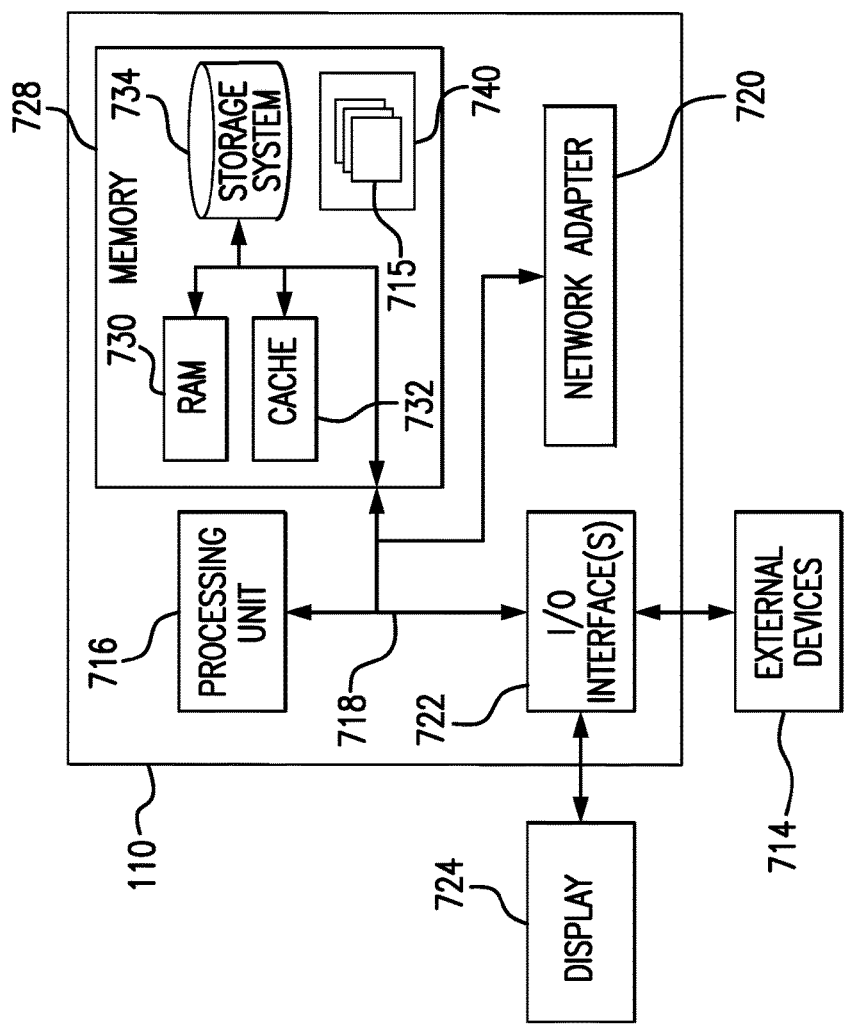
FIG. 7 illustrates internal and external components of a coordinator device in accordance with illustrative embodiments of the present invention.

Embodiments of the network monitoring system may be implemented or executed by one or more computer systems. One such computer system, the coordinator 110 is illustrated in FIG. 7. In various embodiments, coordinator 110 may be a server, a distributed computer system, a workstation, a network computer, a desktop computer, a laptop, or the like.

Coordinator 110 is only one example of a suitable system and is not intended to suggest any limitation as to the scope of use or functionality of embodiments of the invention described herein. Regardless, coordinator 110 is capable of being implemented and/or performing any of the functionality set forth hereinabove.

Coordinator 110 is operational with numerous other general purpose or special purpose computing system environments or configurations. Examples of well-known computing systems, environments, and/or configurations that may be suitable for use with the coordinator 110 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed data processing environments that include any of the above systems or devices, and the like.

The components of the coordinator 110 may be described in the general context of computer system-executable instructions, such as program modules, being executed by a computer system. Generally, program modules may include routines, programs, objects, components, logic, data structures, and so on that perform particular tasks or implement particular abstract data types. Coordinator 110 may be practiced in distributed data processing environments where tasks are performed by processing devices that are linked through a communications network. In a distributed data processing environment, program modules may be located in both local and remote computer system storage media including memory storage devices.

The coordinator system 110 is shown in FIG. 7 in the form of a general-purpose computing device. The components of coordinator 110 may include, but are not limited to, one or more processors or processing units 716, a system memory 728, and a bus 718 that couples various system components including system memory 728 to processor 716.

Bus 718 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Coordinator 110 typically includes a variety of computer system readable media. Such media may be any available media that is accessible by coordinator 110, and it includes both volatile and non-volatile media, removable and non-removable media.

System memory 728 can include computer system readable media in the form of volatile memory, such as random access memory (RAM) 730 and/or cache memory 732. Coordinator 110 may further include other removable/non-removable, volatile/non-volatile computer system storage media. By way of example only, storage system 734 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 718 by one or more data media interfaces. As will be further depicted and described below, memory 728 may include at least one program product having a set (e.g., at least one) of program modules that are configured to carry out the functions of embodiments of the invention.

Program/utility 740, having a set of program modules 715 that may be stored in memory 728 by way of example, and not limitation, as well as an operating system, one or more application programs, other program modules, and program data. Each of the operating system, one or more application programs, other program modules, and program data or some combination thereof, may include an implementation of a networking environment. Program modules generally carry out the functions and/or methodologies of embodiments of the invention as described herein.

Coordinator 110 may also communicate with one or more external devices such as a keyboard, a pointing device, a display, etc.; one or more devices that enable a user to interact with coordinator 110; and/or any devices (e.g., network card, modem, etc.) that enable coordinator 110 to communicate with one or more other computing devices. Such communication can occur via Input/Output (I/O) interfaces 722. Still yet, coordinator 110 can communicate with one or more networks such as a local area network (LAN), a general wide area network (WAN), and/or a public network (e.g., the Internet) via network adapter 720. As depicted, network adapter 720 communicates with the other components of coordinator 110 via bus 718. It should be understood that although not shown, other hardware and/or software components could be used in conjunction with coordinator 110. Examples, include, but are not limited to: microcode, device drivers, redundant processing units, external disk drive arrays, RAID systems, tape drives, and data archival storage systems, etc.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A distributed network traffic flow monitoring system, comprising:
a plurality of network packet flow collector devices for receiving netflow packets associated with a traffic flow activity data at a network connection, the traffic flow activity data comprising one or more transmissions between particular source and destination IP addresses wherein each of the plurality of network packet flow collector devices maintains a plurality of entries corresponding to individual transmissions observed by each of the plurality of network packet flow collector devices; and
a network packet flow coordinator device connected to the plurality of network packet flow collector devices and configured to aggregate probabilistic counter information related to the traffic flow activity data from the plurality of network packet flow collector devices and configured to estimate cardinality of the traffic flow activity data based on the aggregated probabilistic counter information wherein the network packet flow coordinator device is further configured to estimate cardinality of the traffic flow activity data by applying a HyperLogLog technique to the aggregated plurality of entries using one or more probabilistic counters.

2. The system of claim 1, wherein the network packet flow coordinator estimates cardinality of the traffic flow activity data responsive to a request received from a client device.

3. The system of claim 2, wherein the network packet flow coordinator device is further configured to send the estimated cardinality of the traffic flow activity data to the client device.

4. The system of claim 2, wherein the request received from the client device specifies criteria for filtering the traffic flow activity data.

5. The system of claim 1, wherein the network packet flow coordinator device is further configured to aggregate the plurality of entries from the plurality of network packet flow collector devices and configured to estimate cardinality of the traffic flow activity data based on the aggregated plurality of entries.

6. The system of claim 1, wherein at least one of the plurality of network packet flow collector devices is further configured to estimate cardinality of a subset of the plurality of entries that match a filter by applying a HyperLogLog technique to the plurality of entries using one or more probabilistic counters, responsive to a request received from the network packet flow coordinator.

7. The system of claim 1, wherein the network packet flow coordinator device configured to estimate cardinality of the traffic flow activity data is further configured to perform a set operation on the one or more probabilistic counters.

8. The system of claim 7, wherein the set operation is union.

9. A method for estimating cardinality of traffic flow activity data in a distributed network traffic flow monitoring system, the method comprising:

sending, by a network packet flow coordinator device, one or more requests to a plurality of network packet flow collector devices connected to the network packet flow coordinator device, responsive to receiving a request from a client device, the request including criteria for filtering the traffic flow activity data;

aggregating, by the network packet flow coordinator device, responses received from the plurality of network packet flow collector devices, the responses comprising probabilistic counter information related to the traffic flow activity data; and estimating, by the network packet flow coordinator device, cardinality of the traffic flow activity data based on the aggregated probabilistic counter information wherein estimating cardinality of the traffic flow activity data further comprises applying a HyperLogLog technique to the aggregated probabilistic information using one or more probabilistic counters and performing a set operation on the one or more probabilistic counters.

10. The method as recited in claim 9, wherein each of the plurality of network packet flow collector devices maintains a plurality of entries corresponding to individual transmissions observed by each of the plurality of network packet flow collector devices.

11. The method as recited in claim 10, wherein at least one of the plurality of network packet flow collector devices is configured to estimate cardinality of a subset of the plurality of entries that match the filtering criteria by applying a HyperLogLog technique to the plurality of entries using one or more probabilistic counters, responsive to the one or more requests received from the network packet flow coordinator.

12. The method as recited in claim 9, further comprising sending the estimated cardinality of the traffic flow activity data to the client device.

13. The method as recited in claim 9, wherein the set operation is union.

14. The method as recited in claim 9, wherein the traffic flow activity data comprises one or more transmissions between particular source and destination IP addresses.

15. A non-transitory computer readable storage medium and one or more computer programs embedded therein, the computer programs comprising instructions, which when executed by a computer system, cause the computer system to:

send one or more requests to a plurality of network packet flow collector devices connected to the computer system, responsive to receiving a request from a client device, the request including criteria for filtering traffic flow activity data;

maintain a plurality of entries corresponding to individual transmissions observed by each of the plurality of network packet flow collector devices;

aggregate responses received from the plurality of network packet flow collector devices, the responses comprising probabilistic counter information related to the traffic flow activity data; and estimate cardinality of the traffic flow activity data based on the aggregated probabilistic counter information by applying a HyperLogLog technique to the aggregated plurality of entries using one or more probabilistic counters to perform a set operation on the one or more probabilistic counters.

16. The non-transitory computer readable storage medium as recited in claim 15, wherein each of the plurality of network packet flow collector devices maintains a plurality of entries corresponding to individual transmissions observed by each of the plurality of network packet flow collector devices.

\* \* \* \* \*